United States Patent [19]

Geck et al.

[11] 4,120,696

[45] Oct. 17, 1978

[54] PROCESS FOR THE PRODUCTION OF STEEL

[75] Inventors: Günther Geck, Hagen; Jürgen Langhammer, Bremen, Platjenwerbe, both of Germany

[73] Assignee: Klöckner-Werke AG, Duisburg, Germany

[21] Appl. No.: 756,849

[22] Filed: Jan. 5, 1977

Related U.S. Application Data

[63] Continuation of Ser. No. 471,074, May 17, 1974, abandoned.

[30] Foreign Application Priority Data

May 19, 1973 [DE] Fed. Rep. of Germany ....... 2325593

[51] Int. Cl.² .............................................. C21C 5/52
[52] U.S. Cl. ......................................... 75/13; 75/43; 75/44 S; 75/46; 75/129
[58] Field of Search ..................... 75/12, 13, 43, 44 R, 75/44 S, 46, 129

[56] References Cited

U.S. PATENT DOCUMENTS

| | | | |
|---|---|---|---|
| 3,206,301 | 9/1965 | Daubersy | 75/49 |
| 3,501,290 | 3/1970 | Finkl et al. | 75/12 |
| 3,669,434 | 6/1972 | Geck et al. | 75/44 S |

Primary Examiner—M. J. Andrews
Attorney, Agent, or Firm—Michael J. Striker

[57] ABSTRACT

A charge including scrap, sponge iron and ferrous metals is admitted into the top of a vertically arranged melting column and descends through the latter by gravity. The charge is melted by directing a flame against the leading end thereof and the melt flows through an outlet at the bottom of the melting column in to a chamber located beneath and communicating with the melting column. In this chamber, reduction of the slag is effected and the slag is removed from the molten metal. Alloying additions and deoxidizing agents are introduced into the chamber so that the molten metal is deoxidized and becomes alloyed to produce steel having a desired analysis. The thus-produced steel is superheated in the chamber and is then continuously cast.

6 Claims, 2 Drawing Figures

PROCESS FOR THE PRODUCTION OF STEEL

This is a continuation of application Ser. No. 471,074, filed May 17, 1974 now abandoned.

BACKGROUND OF THE INVENTION

The invention relates generally to the production of steel and, more particularly, to a method and arrangement for the continuous production of steel.

A method for melting scrap, particularly steel scrap, is described in the German Pat. No. 1,800,610. Here, scrap is admitted into a vertically arranged melting chamber so as to form a column of scrap. The scrap is melted by directing a flame against the scrap column from beneath the latter. The cross-section of the column of scrap remains substantially constant and, in order to melt the scrap, a flame of plate-shaped configuration is used which is centered with respect to the cross-section of the scrap column. The flame extends across the major portion of the cross-section of the column of scrap. The plate-shaped flame is located so far above the bottom of the melting chamber that the liquid melt which flows off is able to accumulate to some extent over the bottom of the melting chamber and thus serve as a heat-insulator for the heat-resistant lining of the latter. The flame is produced with the aid of a lance burner which is located on the axis of the melting chamber and which either extends through the scrap column or extends into the melting chamber through the bottom thereof.

In this method, the melt which flows off may be fed directly into a container which accommodates liquid pig iron in order to be then further processed. The further processing of this starting metal, namely, melt and pig iron, is conventionally performed by transporting the container with the starting metal to a Siemens-Martin furnace, an electric furnace, a converter or the like and then introducing the starting metal into the furnace or converter.

The above-outlined method has the disadvantage that the liquid starting metal is superheated to only a relatively slight extent. Thus, it is possible to hold this starting metal in the container for only short periods of time without the formation of incrustations and, consequently, the liquid starting metal may be transported over only relatively short distances. Moreover, this method is suitable only for the production of steel on a batch-type or discontinuous basis.

In the publication "Stahl und Eisen," volume 92, pages 515–518, (1972), it has been proposed to combine the continuous scrap-melting operation according to the German Pat. No. 1,800,610 with a continuous process for the production of pig iron such as, for instance, in a cupola furnace. In this manner, it was intended to arrive at a continuous steel production process wherein purification, refining, superheating, alloying and deoxidation must follow in a continuous operation. However, here there exists always the precondition that pig iron which comes, for example, from a blast furnace or a cupola furnace, must be used. This leads to the disadvantage that the process is inherently tied in to the use of furnaces of this type.

Further steel production processes are also known from the publication "Stahl und Eisen," volume 60, pages 1146–1153 (1970) according to each of which a reaction chamber is provided for the boiling out of impurities from, or for the purification or refining of, the continuously flowing pig iron-like material. Here, it is further necessary to blow with, or blow in, oxygen for the purifying or refining operation. A precondition for all of these processes is likewise the provision of pig iron. Scrap is added in these processes but the only purpose of the scrap additions is as a cooling agent for the continuously purified pig iron. However, another disadvantage of these steel production processes, which are reliant upon the provision of continuously flowing pig iron, resides precisely in the fact that the continuous or regulatable introduction of cooling scrap is one of the unsolved problems associated therewith.

SUMMARY OF THE INVENTION

It is, therefore, a general object of the invention to provide a novel process and arrangement for the production of steel.

Another object of the invention is to provide a novel process and arrangement for the continuous production of steel.

A further object of the invention is to provide a method and arrangement whereby the production of steel may be carried out without the use of pig iron.

It is also an object of the invention to provide a method and arrangement whereby continuous further processing of melted scrap without the addition of pig iron may be achieved.

An additional object of the invention is to provide a method and arrangement whereby steel may be produced more simply and economically than was possible heretofore.

The foregoing and other objects are realized, according to the invention, by a process for the production of steel, particularly for the continuous production of steel, wherein an iron-containing charge is admitted into a first zone and is melted in this zone so as to obtain an iron-containing molten metal. The molten metal is introduced into a second zone which communicates with the first zone and alloying additions are admitted into the second zone so as to effect alloying of the molten metal in the second zone and thereby obtain in the second zone a steel having a desired analysis.

Advantageously, the charge used in the process for the continuous production of steel according to the invention contains scrap, iron sponge or the like and corresponding ferrous metals. It is further of advantage in accordance with the invention when the first zone or melting chamber is arranged in a vertical orientation and the charge is introduced into the melting chamber in the region of the upper end thereof so that a column of the charge is formed. This column may descend downwardly through the melting chamber by gravity. Preferably, melting of the charge is effected by directing a flame at the leading end of the charge column, that is, at the bottom of the charge column, so as to obtain continuous melting of the charge. The flame, which is favorably of plate-shaped configuration, is advantageously directed onto or against the bottom of the charge column from below the same. It is further favorable when the flame is substantially centered with respect to the cross-section of the charge column and extends over a major portion of this cross-section, which latter may remain substantially constant. It is of advantage when the flame is positioned some distance above the bottom of the melting chamber so that the melted charge may accumulate on the bottom of the melting chamber to at least some extent and thus provide heat insulation for the heat-resistant lining in the melting chamber.

In general, it is particularly advantageous, in accordance with the invention, when the charge is continuously melted from below in some suitable manner. The entire melt, that is, the molten metal and the slag, may be introduced into the second zone or receiving chamber. The receiving chamber is favorably heated and it is preferable when a continuous separation of the slag from the molten metal is effected in the receiving chamber. The molten metal may be superheated in the receiving chamber and, by the addition of suitable deoxidizing agents and alloying additions to the molten metal, the desired steel analysis may be obtained in the receiving chamber.

The charge is strongly oxidized during the melting operation. As a result, undesirable or impurity components are able to burn off so that purification or refining may occur during the melting operation thereby making it unnecessary to subsequently boil out such components.

As a consequence of the continuous operation, a substantially constant temperature may be maintained in the melting chamber. This is favorable for the heat-resistant material forming the lining of the melting chamber. Moreover, the heat-resistant material may be covered by accumulated liquid metal, this leading to the advantage that adherence of the slag to the heat-resistant lining may be thereby avoided.

Thus, by using the process according to the invention, it becomes possible to continuously produce steel from scrap in an economical manner.

Reduction of the slag may also be carried out in the receiving chamber. The superheating of the molten metal and the reduction of the slag are advantageously carried out by electrical means. Where the charge is clean or of such purity that an additional or special metallurgical refining operation is superfluous and it is only necessary to melt the charge and alloy the molten metal in accordance with the desired steel composition, the heating required to superheat the molten metal may, after separation of the slag from the latter, be performed by induction and in a receiving chamber which has been adjusted so as to have basic conditions therein. On the other hand, where additional slag and FeO reduction are carried out in the receiving chamber, it is of advantage when superheating of the molten metal is accomplished by means of an electric arc.

The steel obtained in the receiving chamber may, with advantage, be continuously cast. It is further of advantage when this steel is introduced into a continuous casting process.

The invention further provides an arrangement for the production of steel, particularly for the continuous production of steel, which includes means defining a melting chamber having an inlet for a charge to be melted and means for melting the charge in the melting chamber. The arrangement further comprises means defining another chamber for receiving molten metal from the melting chamber, and this other chamber communicates with the melting chamber. Means for heating the other chamber is also provided. The arrangement may also include means for admitting alloying additions into the latter chamber so as to effect alloying of the molten metal therein and thereby obtain in this chamber a steel having a desired analysis.

The arrangement in accordance with the invention is particularly well-suited for carrying out the process of the invention. The melting chamber may be arranged in a vertical orientation and the melting means may, for instance, be a lance burner which extends along the vertical axis of the melting chamber. Such a lance burner may extend into the melting chamber through the bottom thereof or it may extend through the charge column formed in the melting chamber. In any event, it is advantageous for the melting means or burner to be arranged in such a manner that the flame generated thereby is directed against the leading or lower end of the charge descending along the melting chamber.

The receiving chamber may be located beneath the melting chamber and the melting chamber may be provided with an outlet for the melt in the bottom thereof via which communication may then be established between the melting chamber and the receiving chamber. The receiving chamber, which is favorably capable of being heated, is preferably mounted for tilting movement and is advantageously releasably connected with the melting chamber so as to permit the receiving chamber to be interchanged with another such chamber. It is of particular advantage when, in accordance with the invention, the receiving chamber is provided with means for separating slag from the molten metal.

The volume or capacity of the receiving chamber is advantageously matched to or selected in dependence upon the melting capacity of the melting chamber. Preferably, the capacity of the receiving chamber is chosen in such a manner as to permit the molten metal to have an average dwell time of about five minutes therein in the event that only superheating of the molten metal is required and so as to permit the average dwell time of the molten metal therein to be up to about twenty minutes if both superheating and slag reduction are necessary.

It is further advantageous when suitable coupling means is provided between the melting chamber and the receiving chamber for minimizing or preventing the infiltration of air.

The advantages of a continuous operation may be fully utilized by proceeding in accordance with the invention. The receiving chambers may be comparatively small relative to the particular production output as determined by the melting chamber or melting means. Consequently, low consumption values may be realized as regards the heat-resistant materials used and, in addition, favorable metallurgical superheating and separation conditions may be obtained. Furthermore, there exists the possibility of operating either with concurrent flow or movement or with countercurrent flow or movement. Also, since the depths of the baths may thus be small and since, in addition, a truly effective and good movement of the baths may be obtained, it is possible to achieve almost ideal thermal efficiencies.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
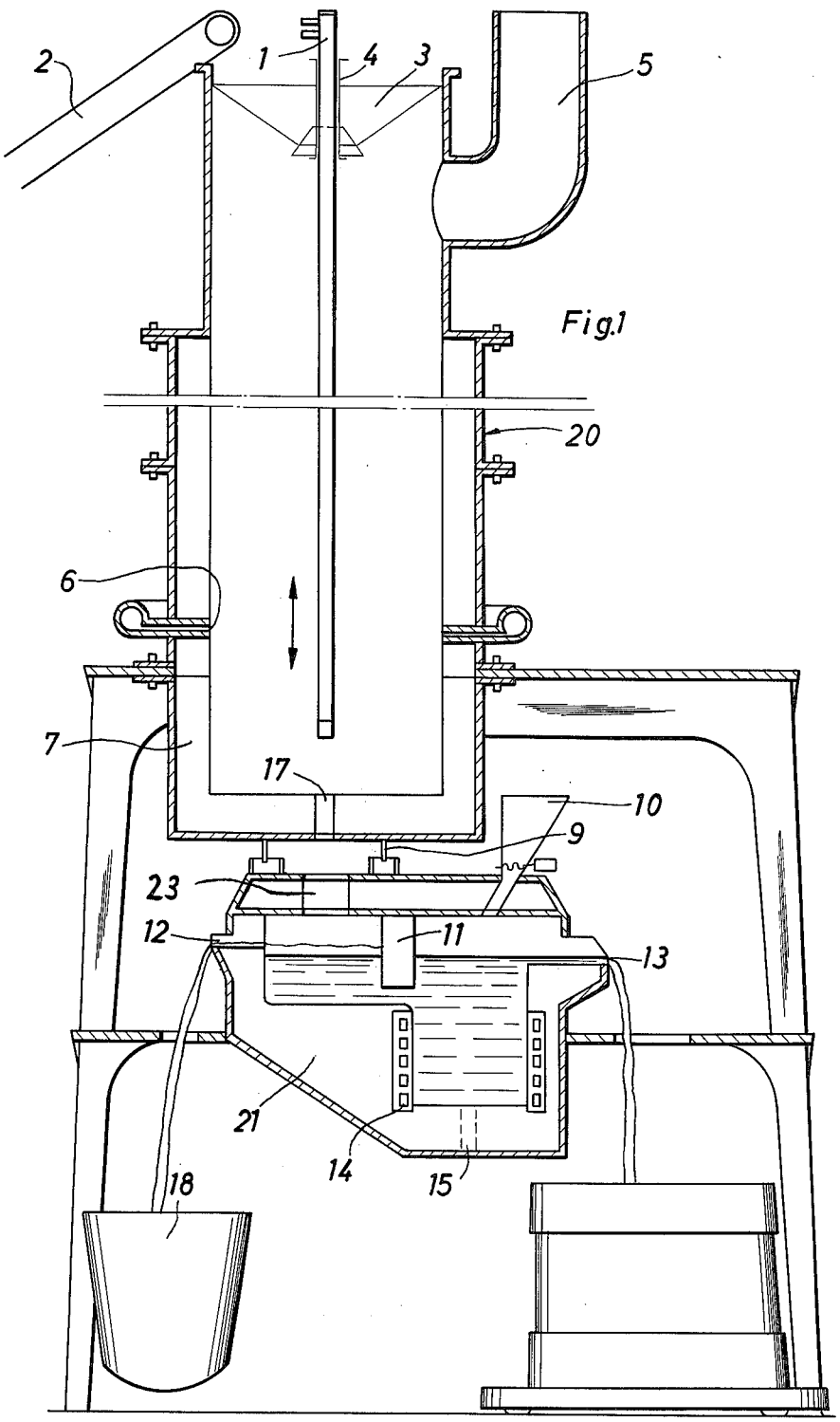
FIG. 1 is a cross-section through a somewhat diagrammatic representation of one form of an arrangement in accordance with the invention which may be used for carrying out the method according to the invention.

Referring now to FIG. 1, the arrangement illustrated therein may be seen to include a melting chamber indicated generally at 20 and a tiltable receiving chamber indicated generally at 21. For reasons which will become apparent as the description proceeds, the receiving chamber 21 may be regarded as a flow-through chamber.

The melting chamber 20, which may be seen to be vertically oriented, is of substantially cylindrical configuration interiorly thereof and the diameter of the melting chamber 20 may increase gradually in downward direction of the same. The melting chamber 20 has an opening at the upper end thereof for charging materials to be melted and, in the region of this opening, there is located a bell-shaped distributing device 3 which is provided primarily for the event that fine scrap or pre-reduced iron sponge is to be melted. A conveyor band 2 conveys material to be melted to the upper end of the melting chamber 20 and into the distributing device 3. Such material may include scrap, for example, steel scrap, compacted or uncompacted iron sponge, compacted or uncompacted pre-reduced pellets, ferrous metals and the like. From the distributing device 3, the charge to be melted is continuously admitted into the interior of the melting chamber 20. In this manner, a column of the charge may be formed in the melting chamber 20.

A lance-shaped oil-oxygen burner 1 extends into the interior of the melting chamber 20 through the distributing device 3 with the aid of a lance guide 4. The burner 1 is mounted for movement in axial direction thereof, that is, in a vertical direction as indicated by the double-headed arrow, thereby enbling the flame generated by the burner 1 to be directed against the leading end or bottom of the charge so that the burner 1 may continuously melt the charge. As the lower portion or leading end of the charge melts, fresh charge is continuously introduced into the melting chamber 20 from the distributing device 3 so that there is a continuous descent of fresh charge along the melting chamber 20.

An annular slot 6 is provided in the melting chamber 20. The slot 6 serves for the introduction of air into the melting chamber 20 in order to permit after-burning of the waste gases generated by the melting operation. The resulting combustion gases serve to preheat the charge to be melted. The melting chamber 20 also communicates with a conduit 5 through which the spent exhaust gases may be withdrawn from the interior of the melting chamber 20.

It may be seen that the melting chamber 20 includes an upper portion and a lower portion 7. Both the upper and lower portions of the melting chamber 20 are lined with a heat-resistant or fire-resistant material. The lower portion 7 of the melting chamber 20 is removably secured to the upper portion thereof and the lower portion 7 is provided with an outlet passage 17 through which the melt produced in the melting chamber 20 may leave the same.

The melt, that is, molten metal and slag, leaving the melting chamber 20 via the outlet passage 17 flows into the receiving chamber 21 through the opening 23. The receiving chamber 21, which is located beneath the melting chamber 20, is advantageously constructed so as to be interchangeable and is preferably arranged in releasable relationship with the melting chamber 20. It may be seen that the receiving chamber 21 is provided with a skimmer 11 which divides it into two communicating accumulation sections, namely, a smaller or more shallow section which is located to the left of the skimmer 11 in the drawing and a larger or deeper section which is located to the right of the skimmer 11 in the drawing. The molten material flowing from the melting chamber 20 into the receiving chamber 21 thus initially enters the smaller, more shallow section of the latter. As schematically illustrated, the slag segregates from and floats on top of the molten metal in the smaller section of the receiving chamber 21 and the thus-accumulated slag flows out of the receiving chamber 21 and into a suitable container 18 via a slag outlet 12 provided in the receiving chamber 21. The heavier molten metal, on the other hand, is able to enter the larger section of the receiving chamber 21 through the gap defined between the skimmer 11 and the bottom of the smaller section of the receiving chamber 21.

The receiving chamber 21 is lined with a high-grade heat-resistant material. At the larger section thereof which is provided for accumulation of the molten metal or the steel, the receiving chamber 21 is provided with an induction coil 14. The coil 14 enables the molten metal or steel accumulated in the larger section of the receiving chamber 21 to be heated or superheated by induction.

A feeder 10 is provided and serves for the introduction of alloying additions and deoxidizing agents into the receiving chamber 21 and, hence, into the molten metal accomodated in the latter. In this manner, the composition of the molten metal in the receiving chamber 21 may be adjusted so as to obtain the desired steel analysis.

The receiving chamber 21 is provided with a steel outlet 13 via which steel having the desired analysis may be removed from the receiving chamber 21. As a result of the continuous introduction of molten material into the receiving chamber 21, steel is continuously flowing out of the latter through the outlet 13. Advantageously, the steel leaving the receiving chamber 21 is continuously cast and, preferably, the steel leaving the receiving chamber 21 is introduced into a continuous casting operation. In order to permit the receiving chamber 21 to be completely emptied, an emptying outlet or tap 15 is provided in the receiving chamber 21.

To prevent entry of infiltrated air into the melting chamber 20, a seal 9 is provided between the melting chamber 20 and the receiving chamber 21. The seal 9 may, for instance, have the form of a sand pocket.

This embodiment of the invention is well-suited for continuous superheating of the molten metal where the charge is clean, that is, of such purity that a special or additional metallurgical purification or refining operation is superfluous. In such an event, the conditions in the receiving chamber may be adjusted so as to be basic and superheating of the molten metal by induction may be carried out under basic conditions. The capacity of the receiving chamber is advantageously between about 5 and 20 tons. The requisite introduction of alloying and deoxidizing additions may be carried out continuously.

Figure 2:
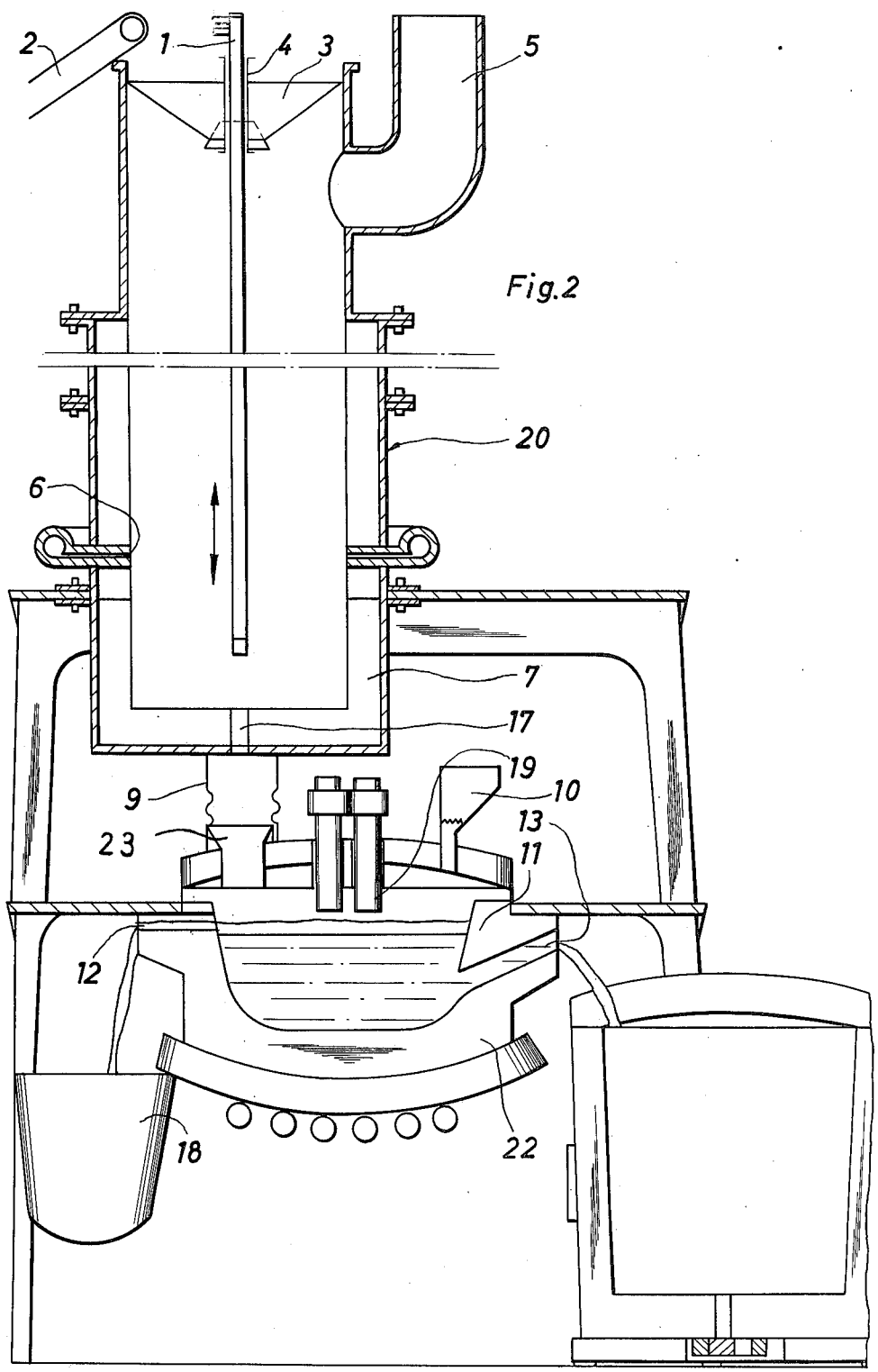
FIG. 2 is a cross-section through a somewhat diagrammatic representation of another form of an arrangement in accordance with the invention which may be used for carrying out the method according to the invention.

Coming now to the arrangement illustrated in FIG. 2, it may be seen that the same reference numerals as in FIG. 1 have been used to designate similar components. The arrangement of FIG. 2 includes a melting chamber 20 as described above. Here, however, the receiving chamber is designated with the reference numeral 22 and it will be appreciated that the receiving chamber 22 differs from the receiving chamber 21 of FIG. 1. The receiving chamber 22 is mounted for tilting movement and is provided with a cover. In contrast to the embodiment of FIG. 1, where the induction coil 14 is provided for heating the receiving chamber 21, there are here provided electrodes 19 for heating the receiving chamber 22. The electrodes 19 permit an electric arc to be generated and directed over the melt in the receiving chamber 22.

The molten metal flowing out of the melting chamber 20 through the outlet 17 thereof enters the receiving chamber 22 via its opening 23 provided in the cover of the receiving chamber 22. A seal 9 is located between the outlet 17 and the opening 23 in order to minimize the entry of infiltrated air. The slag is removed from the receiving chamber 22 via the slag outlet 12 located at one side of the receiving chamber 22 and beneath the cover of the latter.

The steel outlet 13 is located at the side of the receiving chamber 22 opposite that provided with the slag outlet 12 and the finished steel leaves the receiving chamber 22 via the steel outlet 13. Again, the steel leaving the receiving chamber 22 may advantageously be continuously cast and is preferably introduced into a continuous casting operation. In the present instance, the steel outlet 13 is downwardly inclined in direction from the exterior of the receiving chamber 22 to the interior thereof. The steel outlet 13 is here defined between the skimmer 11 and the bottom surface of the receiving chamber 22 and it may be seen that the side of the skimmer 11 facing this surface of the receiving chamber 22 is also downwardly inclined in direction from the exterior of the receiving chamber 22 to the interior thereof. The receiving chamber 22 is favorably constructed as an interchangeable vessel and is favorably arranged in releasable relationship with the melting chamber 20.

This embodiment of the invention is well-suited for continuous superheating of the molten metal in cases where FeO reduction and additional slag reaction are carried out. The introduction of alloying and deoxidizing additions into the receiving chamber 22 may be carried out continuously via the feeder 10.

It will be appreciated from the foregoing description that the invention has provided a process and arrangement which permit steel to be produced without the use of pig iron.

The temperature in the receiving chambers is substantially constant. This substantially constant temperature in the receiving chambers permits the use of linings made of heat-resistant materials which are entirely basic in nature. In contrast, such linings can almost never be used in discontinuously operating electric furnaces, particularly induction furnaces. Correspondingly, the electric arc heated receiving chamber 32 may be provided with a cover which is entirely basic in nature. Such covers cannot be used in conventional electric arc furnaces where they are subjected to high loads due to radical temperature changes. On the other hand, since temperature in the receiving chambers is substantially constant, the cover for the receiving chamber 22 will not be subjected to the high loads generated by radical temperature changes.

It will be understood that each of the elements described above, or two or more together, may also find a useful application in other types of processes and arrangements differing from the types described above.

While the invention has been illustrated and described as embodied in a process and arrangement for the production of steel, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A process for the continuous production of steel from a ferrous metal charge, comprising
    admitting said ferrous metal charge into a substantially vertically arranged first zone so as to form a column of said charge in said first zone,
    said charge continuously descending along said first zone by gravity,
    and the leading end of said column being located in said first zone;
    continuously melting said leading end by directing an oxidizing flame at said column from below said column, thereby burning off impurity components in said charge during the melting thereof,
    so as to obtain a mass which includes molten steel and slag;
    continuously performing direct transfer of said mass from said first zone into a second zone which is arranged below and communicates with said first zone,
    said second zone being at least substantially sealed from ambient atmosphere so as to prevent oxygen from entering said second zone;
    continously separating and removing said slag from said molten metal in said second zone;
    superheating said molten metal by electrical means;
    and introducing a deoxidizing agent and alloying additions into said superheated molten metal thereby obtaining steel having a desired composition;
    and continuously removing said steel from said second zone.

2. A process as defined in claim 1,
    wherein said charge is of such purity that additional refining in the second zone is superfluous,
    said mass being superheated after slag removal by means of induction.

3. A process as defined in claim 1,
    wherein said charge is of such purity that additional slag refining and FeO reduction are to be performed,
    said mass being superheated by means of arc electrodes.

4. A process as defined in claim 2, including the step of maintaining basic conditions in said second zone.

5. A process as defined in claim 1, wherein said steel is produced without pig iron.

6. A process as defined in claim 1, utilizing the steel continuously removed from said second zone in a continuous casting operation.

* * * * *